(12) United States Patent
Singh et al.

(10) Patent No.: US 11,975,738 B2
(45) Date of Patent: May 7, 2024

(54) IMAGE ANNOTATION FOR DEEP NEURAL NETWORKS

(71) Applicant: Ford Global Technologies, LLC, Dearborn, MI (US)

(72) Inventors: Gurjeet Singh, Castro Valley, CA (US); Apurbaa Mallik, Sunnyvale, CA (US); Rohun Atluri, Folsom, CA (US); Vijay Nagasamy, Fremont, CA (US); Praveen Narayanan, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 344 days.

(21) Appl. No.: 17/337,789

(22) Filed: Jun. 3, 2021

(65) Prior Publication Data
US 2022/0388535 A1  Dec. 8, 2022

(51) Int. Cl.
*B60W 60/00* (2020.01)
*G06T 3/4053* (2024.01)
(Continued)

(52) U.S. Cl.
CPC .... *B60W 60/0011* (2020.02); *B60W 60/0017* (2020.02); *G06T 3/4053* (2013.01); *G06T 7/11* (2017.01); *G06T 11/20* (2013.01); *G06V 20/58* (2022.01); *G06T 2207/20081* (2013.01); *G06T 2207/20084* (2013.01); *G06T 2207/20132* (2013.01); *G06T 2207/30261* (2013.01); *G06T 2210/12* (2013.01)

(58) Field of Classification Search
CPC . B60W 60/0011; B60W 60/0017; G06T 7/11; G06T 3/4053; G06T 11/20; G06V 20/58
See application file for complete search history.

(56) References Cited

U.S. PATENT DOCUMENTS 8,065,313 B2  11/2011  Yagnik
8,620,026 B2  12/2013  Datta et al.
(Continued)

OTHER PUBLICATIONS

Cusana, C., et al., "Image annotation using SVM," ResearchGate, Article in Proceedings of SPIE—The International Society for Optical Engineering, Dec. 2003, 10 pages.
(Continued)

*Primary Examiner* — Mia M Thomas
(74) *Attorney, Agent, or Firm* — Frank A. MacKenzie; Bejin Bieneman PLC

(57) ABSTRACT

A first image can be acquired from a first sensor included in a vehicle and input to a deep neural network to determine a first bounding box for a first object. A second image can be acquired from the first sensor. Input latitudinal and longitudinal motion data from second sensors included in the vehicle corresponding to the time between inputting the first image and inputting the second image. A second bounding box can be determined by translating the first bounding box based on the latitudinal and longitudinal motion data. The second image can be cropped based on the second bounding box. The cropped second image can be input to the deep neural network to detect a second object. The first image, the first bounding box, the second image, and the second bounding box can be output.

20 Claims, 9 Drawing Sheets

(51) Int. Cl.
*G06T 7/11* (2017.01)
*G06T 11/20* (2006.01)
*G06V 20/58* (2022.01)

(56) References Cited

U.S. PATENT DOCUMENTS

| | | | |
|---|---|---|---|
| 10,593,049 B2 | 3/2020 | Hollander et al. | |
| 10,614,310 B2* | 4/2020 | Polak | G06V 40/20 |
| 10,872,531 B2 | 12/2020 | Liii et al. | |
| 10,891,518 B1* | 1/2021 | Joshi | G06N 20/20 |
| 11,112,875 B1* | 9/2021 | Zhou | G06F 3/017 |
| 11,126,180 B1* | 9/2021 | Kobilarov | B60W 30/095 |
| 11,195,418 B1* | 12/2021 | Hong | G08G 1/166 |
| 11,380,108 B1* | 7/2022 | Cai | G06N 20/00 |
| 11,409,304 B1* | 8/2022 | Cai | B60W 60/001 |
| 11,769,331 B2* | 9/2023 | Crona | G06V 20/54 |
| | | | 382/103 |
| 11,790,668 B2* | 10/2023 | Vig | G06V 10/82 |
| | | | 382/104 |
| 2018/0204076 A1* | 7/2018 | Tripathi | G06V 10/774 |
| 2019/0244385 A1* | 8/2019 | Zhao | B64C 39/024 |
| 2020/0020117 A1* | 1/2020 | Daehler | G06N 3/045 |
| 2020/0026282 A1* | 1/2020 | Choe | B60W 60/001 |
| 2020/0159222 A1* | 5/2020 | Mao | G06T 7/593 |
| 2020/0160070 A1* | 5/2020 | Sholingar | G06T 7/70 |
| 2020/0217667 A1* | 7/2020 | Kim | G06V 10/255 |
| 2020/0356790 A1* | 11/2020 | Jaipuria | G06F 18/28 |
| 2021/0027103 A1 | 1/2021 | Brower | |
| 2021/0103745 A1* | 4/2021 | Chakravarty | G06V 20/584 |
| 2021/0150228 A1* | 5/2021 | Goforth | B60W 30/0956 |
| 2021/0397857 A1* | 12/2021 | Liu | B60W 60/0025 |
| 2022/0366250 A1* | 11/2022 | Kim | G06N 3/08 |
| 2022/0398461 A1* | 12/2022 | Jaipuria | G06N 3/084 |
| 2023/0005114 A1* | 1/2023 | Shin | G06V 10/7715 |

OTHER PUBLICATIONS

Gong, Y., et al., "Deep Convolutional Ranking for Multilabel Image Annotation," arXiv:1312.4894v2 [cs.CV], Apr. 14, 2014, 9 pages.

Jeon, J., et al., "Automatic Image Annotation and Retrieval using CrossMedia Relevance Models," Center for Intelligent Information Retrieval, Computer Science Department, University of Massachusetts, 2003, 8 pages.

Kaushal, V., et al., "Learning From Less Data: A Unified Data Subset Selection and Active Learning Framework for Computer Vision," arXiv:1901.01151v1 [cs.CV], Jan. 3, 2019, 11 pages.

* cited by examiner

IMAGE ANNOTATION FOR DEEP NEURAL NETWORKS

BACKGROUND

Deep neural networks can be trained to perform a variety of computing tasks. For example, neural networks can be trained to extract data from images. Data extracted from images by deep neural networks can be used by computing devices to operate systems including vehicles, robots, security, product manufacturing and product tracking. Images can be acquired by sensors included in a system and processed using deep neural networks to determine data regarding objects in an environment around a system. Operation of a system can rely upon acquiring accurate and timely data regarding objects in a system's environment.

DETAILED DESCRIPTION

Figure 1:
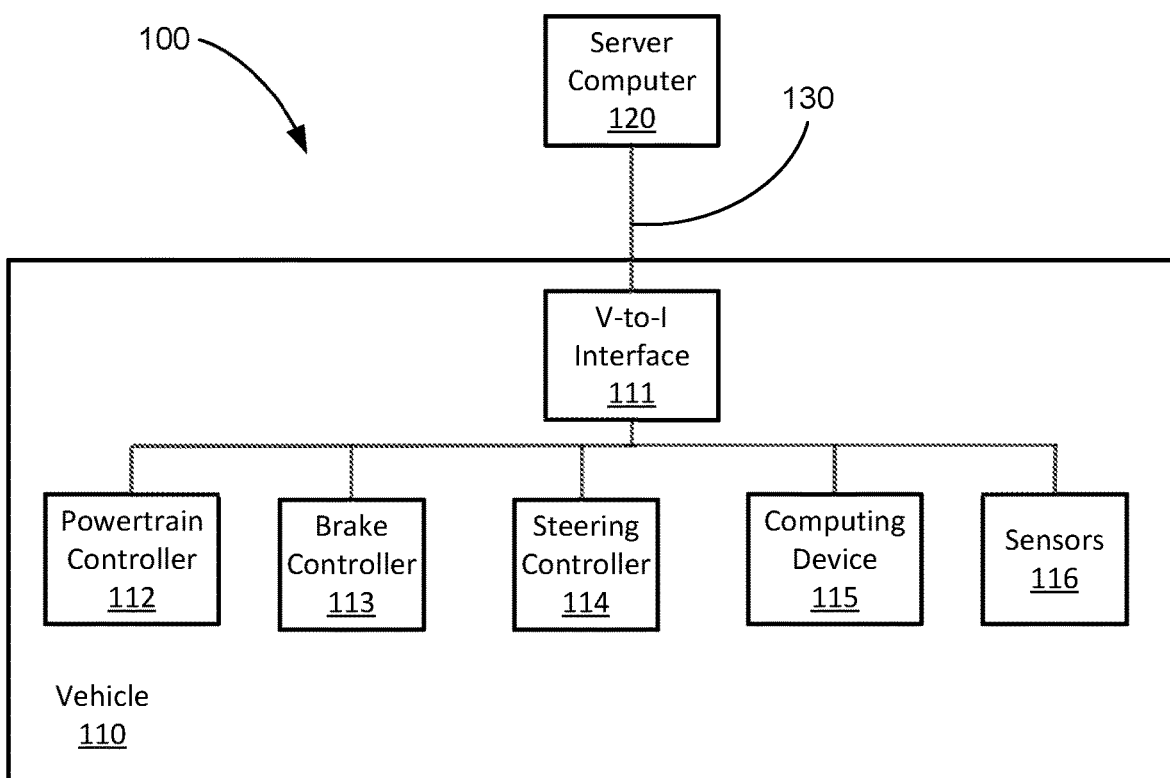
FIG. 1 is a block diagram of an example deep neural network system.

A deep neural network (DNN) can be trained to determine objects in image data acquired by sensors using a training dataset for systems including vehicle guidance, robot operation, security, manufacturing, and product tracking. Vehicle guidance can include operation of vehicles in autonomous or semi-autonomous modes. Robot guidance can include guiding a robot end effector, for example a gripper, to pick up a part and orient the part for assembly. Security systems include features where a computer acquires video data from a camera observing a secure area to provide access to authorized users and detect unauthorized entry. Security systems can also provide an authorized user access to a computing device or cell phone, for example. In a manufacturing system, a DNN in a computer can detect undesired operation of machinery in a manufacturing operation by determining a location of a person's hands at a particular time in relation to a machine operating cycle, for example. In a product tracking system, a deep neural network can detect a person removing an object from a shelf and putting it into a shopping cart and automatically charge the person for the object, for example. Other product tracing systems include package sorting for shipping, for example.

DNNs are trained by processing a large number, which can exceed 1000 and sometimes reach 1,000,000 or more, of images in a training dataset. Training a DNN to detect objects in images can require corresponding annotation or labeling, also referred to herein as ground truth, for each image in the training dataset. In this context detecting an object in an image includes determining a label and a bounding box for the object. A label is a text string that identifies the object such as "vehicle" or "pedestrian." A bounding box is a minimally enclosing rectangle, i.e., a rectangle as large as needed to encompass all pixels deemed to represent the object, but no larger, with sides parallel to the sides or borders of the image that includes the object. Training a DNN can require annotation including a label and a bounding box for each image in the training dataset that includes an object.

Vehicle guidance will be described herein as a non-limiting example of using a DNN with anomalous data detection. For example, a computing device in a vehicle can be programmed to acquire image data regarding the external environment of a vehicle and detect objects in the image data using a DNN. The data can include image data acquired from a still or video camera, range data acquired from a lidar sensor or radar data acquired from a radar sensor. A DNN can be trained to label and locate objects in the image data, range data, or radar data. The computing device can use the identity and location of the detected objects to determine a vehicle path upon which to operate a vehicle in an autonomous or semi-autonomous mode. A vehicle can operate on a roadway based on a vehicle path by determining commands to direct the vehicle's powertrain, braking, and steering components to operate the vehicle to travel along the path. Determining anomalous data can determine when to disregard a prediction output from a DNN and thereby avoid operating the vehicle based on an unexpected result.

The large number of images required to train a DNN to detect objects for vehicle guidance can be obtained using video data. Obtaining training dataset images that are similar to the types of images including the types of objects that will be encountered by the DNN at inference time, i.e., when the DNN is being used in the real world can improve the training of a DNN. Video data for training a DNN to be used for vehicle guidance can be obtained by mounting a video camera on a vehicle and driving the vehicle through the types of environments that a vehicle can encounter during normal operation while acquiring video data. Obtaining a training dataset in this fashion can provide training data that will include traffic scenes and objects similar to traffic scenes and object to be encountered by a vehicle in real world situations and thereby provide a large number of high quality training images.

Training a DNN using unreliably annotated training images can yield unreliable performance by the DNN at inference time. Techniques discussed herein can improve acquisition of a training dataset by using a DNN to annotate images acquired by a video camera included in a vehicle, and, when the DNN fails to detect an object in an image, crop the image based on vehicle motion data and a previously detected object and use the cropped image to determine image annotations. Techniques discussed herein can further improve annotation of images by modifying the cropped image using super resolution, blurring, zooming, and hierarchical pyramid cropping to improve the training dataset.

Disclosed herein is a method including acquiring a first image from a first sensor included in a vehicle and input the first image to a deep neural network to determine a first bounding box for a first object, inputting a second image from the first sensor, and inputting latitudinal and longitudinal motion data from second sensors included in the vehicle corresponding to a time between inputting the first image and inputting the second image. The method includes determining a second bounding box by translating the first bounding box based on the latitudinal and longitudinal motion data, cropping the second image based on the second bounding box, inputting the cropped second image to the deep neural network to detect a second object, and outputting the first image, the first bounding box, the second image, and the second bounding box. Upon trying and failing to determine the second bounding box using the deep neural network, the second bounding box can be determined by translating the first bounding box based on the latitudinal and longitudinal motion data. The first image, the first bounding box, the second image, and the second bounding box can be uploaded to a second computer to train the deep neural network.

The second bounding box can be determined by incrementally translating the first bounding box in directions indicated by the latitudinal and longitudinal motion data. The second sensors can include sensors that acquire one or more of steering wheel direction and vehicle forward/backward motion. The second sensors can include an inertial measurement unit. The cropped second image can be transformed to a higher spatial resolution by super resolution. The cropped second image can be transformed to include motion blurring. The cropped second image can be transformed by zooming the cropped second image. The cropped second image can be transformed to include hierarchical pyramid processing to obtain image data including the second object at a plurality of spatial resolutions. One or more of the first and second bounding boxes can be used to operate the vehicle. A vehicle path can be determined based on one or more of the first and second bounding boxes. The vehicle can be operated on the vehicle path by controlling vehicle powertrain, vehicle brakes and vehicle steering. The trained deep neural network can be downloaded to a computing device in a vehicle.

Further disclosed is a computer readable medium, storing program instructions for executing some or all of the above method steps. Further disclosed is a computer programmed for executing some or all of the above method steps, including a computer apparatus, programmed to acquire a first image from a first sensor included in a vehicle and input the first image to a deep neural network to determine a first bounding box for a first object, input a second image from the first sensor, and input latitudinal and longitudinal motion data from second sensors included in the vehicle corresponding to a time between inputting the first image and inputting the second image. The computer can be further programmed to determine a second bounding box by translating the first bounding box based on the latitudinal and longitudinal motion data, crop the second image based on the second bounding box, input the cropped second image to the deep neural network to detect a second object, and output the first image, the first bounding box, the second image, and the second bounding box. Upon trying and failing to determine the second bounding box using the deep neural network, the second bounding box can be determined by translating the first bounding box based on the latitudinal and longitudinal motion data. The first image, the first bounding box, the second image, and the second bounding box can be uploaded to a second computer to train the deep neural network.

The computer can be further programmed to determine the second bounding box by incrementally translating the first bounding box in directions indicated by the latitudinal and longitudinal motion data. The second sensors can include sensors that acquire one or more of steering wheel direction and vehicle forward/backward motion. The second sensors can include an inertial measurement unit. The cropped second image can be transformed to a higher spatial resolution by super resolution. The cropped second image can be transformed to include motion blurring. The cropped second image can be transformed by zooming the cropped second image. The cropped second image can be transformed to include hierarchical pyramid processing to obtain image data including the second object at a plurality of spatial resolutions. One or more of the first and second bounding boxes can be used to operate the vehicle. A vehicle path can be determined based on one or more of the first and second bounding boxes. The vehicle can be operated on the vehicle path by controlling vehicle powertrain, vehicle brakes and vehicle steering. The trained deep neural network can be downloaded to a computing device in a vehicle.

FIG. 1 is a diagram of an object detection system 100 that can be included in a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
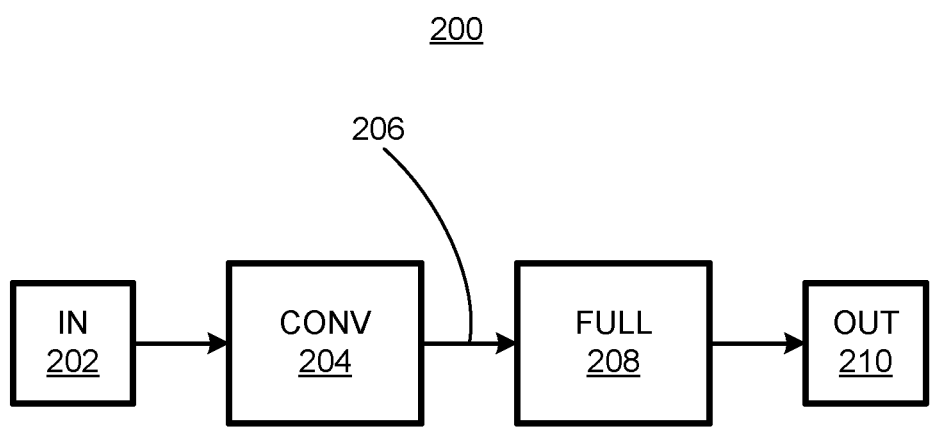
FIG. 2 is a diagram of an example deep neural network.

FIG. 2 is a diagram of a DNN 200. A DNN 200 can be a software program executing on a computing device 115 or a server computer 120 included in an object detection system 100. In this example DNN 200 is illustrated as a convolutional neural network (CNN). Techniques described herein can also apply to DNNs that are not implemented as CNNs. A DNN 200 implemented as a CNN typically inputs an image (IN) 202 as input data. The input image 202 is processed by convolutional layers 204 to form latent variables 206 (i.e., variables passed between neurons in the DNN 200). Convolutional layers 204 include a plurality of layers that each convolve an input image 202 with convolution kernels that transform the input image 202 and process the transformed input image 202 using algorithms such as max pooling to reduce the resolution of the transformed input image 202 as it is processed by the convolutional layers 204. The latent variables 206 output by the convolutional layers 204 are passed to fully connected layers 208. Fully connected layers 208 include processing nodes. Fully connected layers 208 process latent variables 206 using linear and non-linear functions to determine an output prediction (OUT) 210. In examples discussed herein the output prediction 210 includes an object label and a bounding box.

DNN 200 can input an image 202 acquired by sensors 116 included in object detection system 100. The object detection system 100 can be included in or with a machine such as a vehicle 110; sensors 116 can include a video camera. Image 202 can be a frame of video data that includes an environment around a vehicle 110 and an object can be a vehicle or a pedestrian, for example. DNN 200 can process image 202 to determine a prediction 210 that includes a label and a bounding box that includes an object in an image 202. A computing device 115 in a vehicle 110 can receive the output prediction 210 and perform operations based on the output predictions 210. In examples where object detection system 100 is included in a vehicle 110, the output predictions 210 can include an object label and object bounding box. For example, a computing device 115 can determine a vehicle path upon which to operate a vehicle 110 based on an object label and bounding box included in output predictions 210.

DNN 200 can be trained using a training dataset that includes images and corresponding ground truth. Training datasets for a DNN 200 can include thousands or millions of images and corresponding annotations or ground truth. Each image of the training dataset can be processed a plurality of times by the DNN 200. A prediction 210 output from the DNN 200 in response to an input image 202 is compared to the ground truth corresponding to the image 202 to determine a loss function. The loss function is a mathematical function that determines how closely the prediction 210 output from DNN 200 matches the ground truth corresponding to the input image 202. The value determined by the loss function is input to the convolutional layers 204 and fully connected layers 208 of DNN 200 where it is backpropagated to determine weights for the layers that correspond to a minimum loss function. Backpropagation is a technique for training a DNN 200 where a loss function is input to the convolutional layers 204 and fully connected layers 208 furthest from the input and communicated from back-to-front and determining weights for each layer 204, 208 by selecting weights that minimize the loss function.

Figure 3:
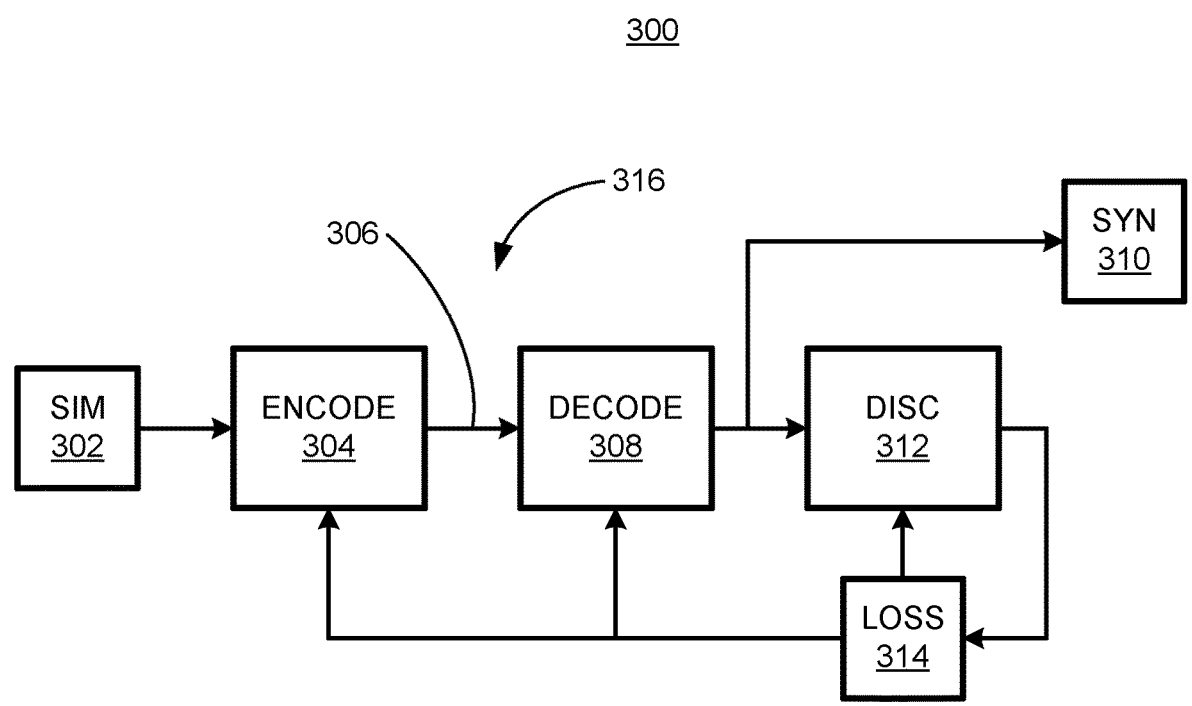
FIG. 3 is a diagram of an example generative adversarial network.

FIG. 3 is a diagram of a generative adversarial network (GAN) 300. A GAN 300 is a deep neural network that can be trained to perform style transformations. In examples described herein GAN 300 can be trained to input simulated images (SIM) 302 and output synthetic images (SYN) 310. A simulated image 302 is an image generated by photorealistic rendering software, for example Unreal Engine, available from Epic Games, Cary NC, 27518. Photorealistic rendering software is software for generating images that can appear as if they were acquired by a real-world camera. Photorealistic rendering software can input a scene description file which includes data describing the scene to be rendered including descriptions of geometry and textures of objects such as vehicles, pedestrians and buildings, backgrounds such as roadways, and foliage and data describing lighting and weather conditions. The scene description file can also include data regarding a virtual camera that will be used to render the scene including location, orientation, and virtual lens magnification. The photorealistic rendering software can trace virtual rays of light from virtual light sources as it reflects off objects and backgrounds and is focused by the virtual camera lens onto a virtual camera sensor to generate the simulated image 302.

The degree of photorealism included in simulated images 302 is a function of the detail included in the scene description file and the amount of computing resources devoted to rendering the simulated image 302. Generating a simulated image with sufficient photorealism to be used to train a DNN 200 can require considerable number of trial-and-error iterations that require a large amount of time and computing resources. A typically more efficient technique for increasing the photorealism of a simulated image 302 that yields synthetic images 310 that are include sufficient photorealism to be used to train a DNN 200 is to use a GAN 300 to add photorealistic features to simulated images 302. Photorealistic features are portions of an image that make the image look more like it was acquired using a real-world camera viewing a real-world scene. Photorealistic features include realistic details on objects and backgrounds, for example. Simulated images 302 can be generated with limited photorealism and processed with a GAN 300 to generate a synthetic image 310 with a greater amount of photorealistic features in far less time and using fewer computing resources than trying to generate a simulated image 302 that includes the photorealistic features.

A GAN 300 includes a generator 316 that includes an encoder (ENCODE) 304 and a decoder (DECODE) 308. The encoder 304 includes convolutional layers that reduce the input simulated image 302 to latent variables 306 that correspond to a compressed version of the simulated image 302. The latent variables 306 are input to convolutional layers included in the decoder 308 that expand the latent variables 306 into a full-resolution synthetic image 310 that includes photorealistic features that make the synthetic image 310 appear as if it were acquired using a real-world camera viewing a real-world scene. The increased realism included in the synthetic image 310 can permit the synthetic images 310 to be used to train a DNN 200 to detect objects reliably in real world images.

The GAN 300 can be trained to generate highly realistic synthetic images 310 by training a discriminator (DISC) 312 to distinguish between "real" images and "fake" images, where "real" images are images that would appear to a user as if they were acquired using a real-world camera viewing a real-world scene, and "fake" images are images that do not appear as if they were acquired using a real-world camera viewing a real-world scene. During training the convolutional layers included in the discriminator 312 output a value between 0 and 1, where 0 corresponds to a "fake" image and "1" corresponds to a "real" image. The output value is returned to a loss function (LOSS) 314 which determines, i.e., outputs from, a loss function based on the discriminator output and ground truth data that corresponds to the identity of the input image, i.e., whether the input to the GAN 300 is a real image or a simulated image 302. The loss function 314 is fed back to the discriminator 312, the encoder 304 and the decoder 308 to determined weights for the discriminator 312, the encoder 304 and the decoder 308 that minimize the loss function and thereby train the GAN 300. The trained GAN 300 will then input simulated images 302 and output synthetic images 310 that include realistic features. Realistic features included in the synthetic images 310 can include photorealistic details of objects and backgrounds and weather conditions such as rain or snow.

Figure 4:
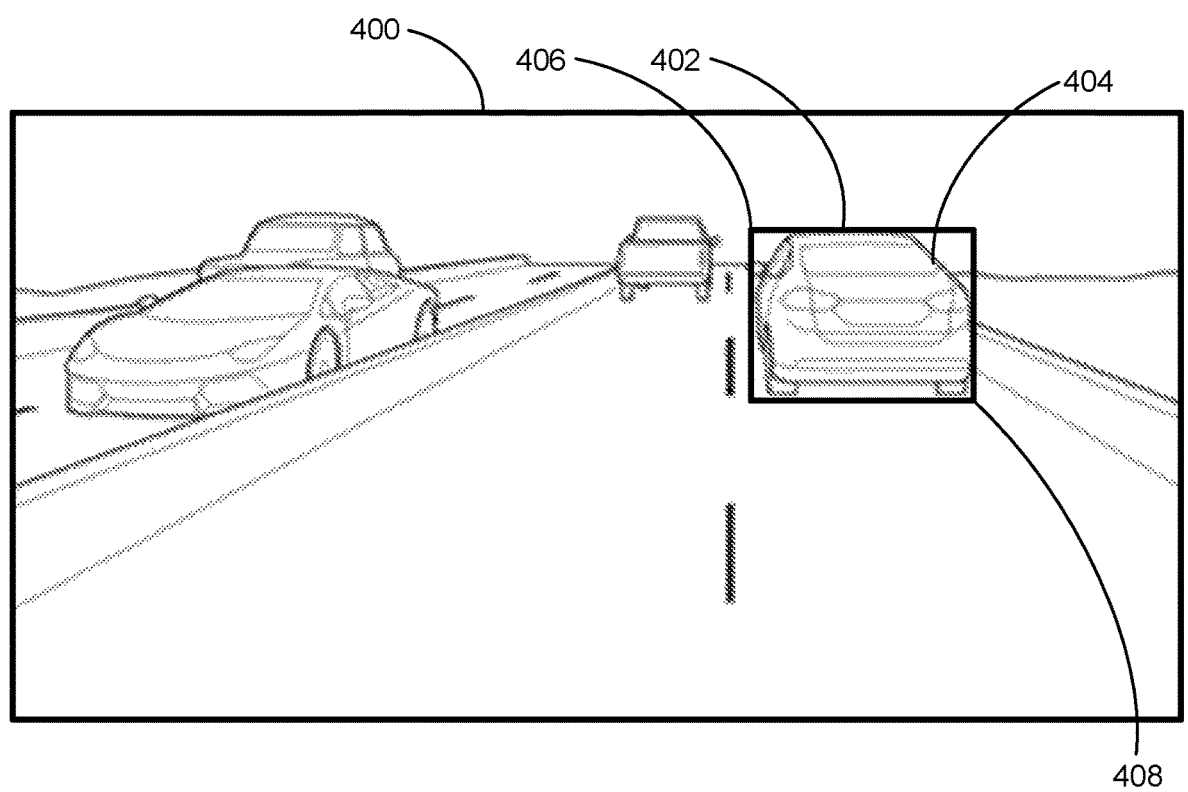
FIG. 4 is a diagram of an example image including a bounding box.

FIG. 4 is a diagram of an example image 400 including a bounding box 402 determined based on an object 404, in this example a vehicle. Bounding box 402 can be determined by acquiring the image 400 from a video sensor included in a vehicle 110 and inputting the image 400 to a DNN 200 executing on a computing device 115 included in the vehicle 110. DNN 200 can be trained to detect an object by determining an object label, in this example "vehicle", and a bounding box 402 for the object 404 based on a limited training dataset that can include fewer than 1000 annotated images. A bounding box 402 can be defined by an upper left corner 406 and a lower right corner 408. In examples where a DNN 200 can be trained using a limited training dataset, the DNN 200 can determine object labels and bounding boxes 402 for objects in a limited number of configurations. A DNN 200 trained with a limited training dataset may be able to detect objects when viewed from a limited number of perspectives at a limited number of sizes with respect to the image frame. For example, a DNN 200 trained with a limited training dataset may only be able to detect vehicles viewed from a rear view at a single size. Techniques discussed herein can improve generation of training datasets by using bounding boxes generated by a DNN 200 based on limited training to generate annotated images for images that the DNN 200 cannot process due to limited training.

A computing device 115 in a vehicle 110 can input an image 400 corresponding to a first frame of video data acquired from a video sensor included in the vehicle 110 to a DNN 200 executing on the computing device 115. The DNN 200 can determine a bounding box 402 and a label corresponding to an object 404. The computing device 115 can input a second image corresponding to a second frame of video data from the video sensor to the DNN 200. In this example, the DNN 200 can fail to determine a bounding box and label for an object included in the second image because the appearance of the object in the second image has changed due to movement of the vehicle 110 between the time that the first frame of video data was acquired, and the time second frame of video data was acquired. The appearance of the object can change due to a difference in orientation of the object. For example, the first frame of video data can include a view of the object from the rear and the second frame can include a view of the object that includes more of a side of the object. The object can appear at a different size in the second frame of video data due to the vehicle 110 moving closer or farther away from the object. The object can also become partially obscured due to the motion of the vehicle between the time the first frame of video data was acquired, and the time second frame of video data was acquired. All of these changes in appearance can cause a DNN 200, trained with a limited training dataset, to fail to detect an object.

Techniques described herein can improve the operation of DNNs 200 by using a DNN 200 trained with a first training dataset to generate annotated image to be included in a much larger training dataset that can then be used to train the DNN 200 to detect objects in a much larger variety of poses and sizes including detecting objects in images where the object can be partially obscured. Techniques described herein, starting with an image in which a DNN 200 has detected an object, use vehicle motion as determined by sensors 116 included in the vehicle 110 to relocate and resize a bounding box to include the object in a second image acquired by a video sensor included in the vehicle 110. The image can also be cropped based on the relocated and resized bounding box 402 and passed back to the DNN 200 to give the DNN 200 another attempt to detect the object with all extraneous background eliminated by cropping. In this context cropping an image is using the bounding box to delete portions of the image outside of the bounding box 402 The second image, along with annotation data from the previous image including the relocated and resized bounding box can be stored in the computing device 115.

Techniques discussed herein can generate training datasets that include millions of annotated images. Techniques discussed herein generate annotated images using a small fraction of the computing resources required to manually generate millions of annotated images. In addition, techniques discussed herein generate more reliable annotated data by eliminating differences in user judgement in determining annotations.

Figure 5:
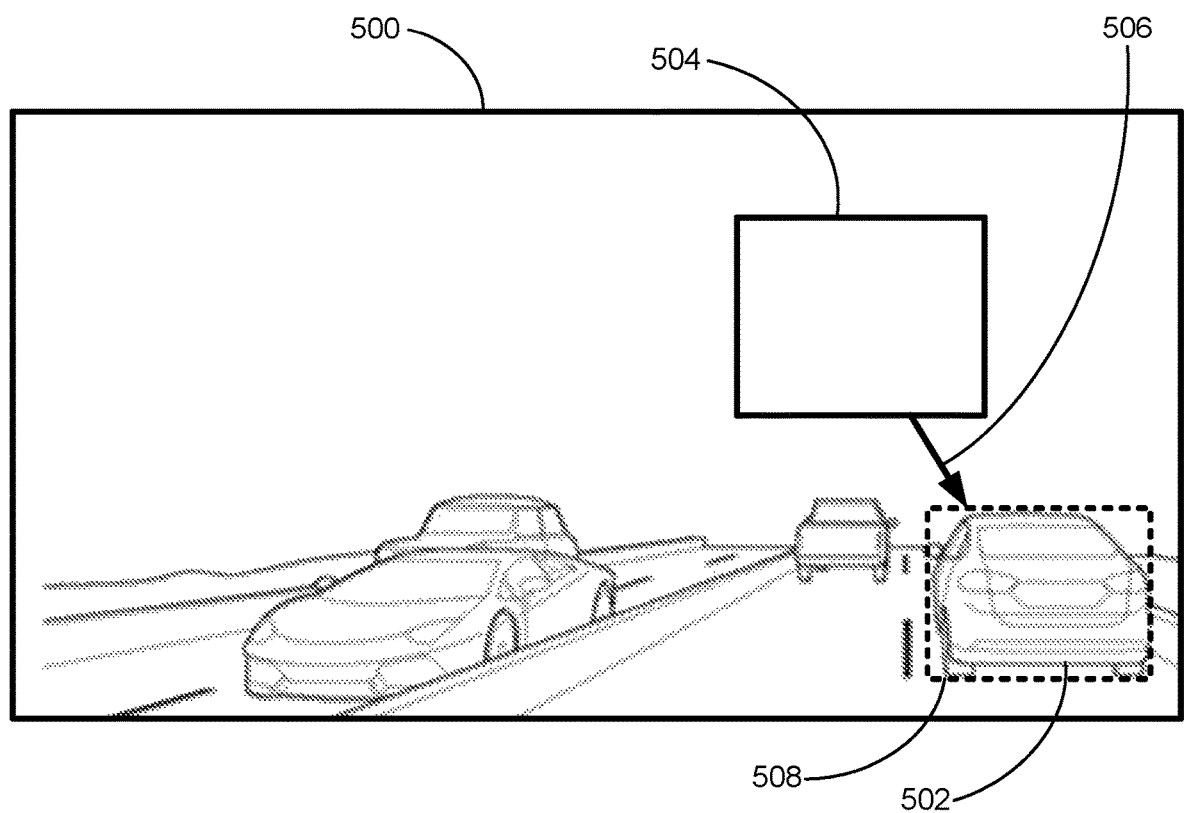
FIG. 5 is a diagram of another example image including a bounding box.

FIG. 5 is a diagram of an image 500 including a bounding box 504 determined based on a bounding box 402 from a previous image 400. Image 500 can correspond to a second frame of video data acquired by a video sensor included in a vehicle 110. Bounding box 504 is included in image 500 at the location of bounding box 402 generated by inputting the previous image 400 corresponding to a first frame of video data acquired by the video sensor to DNN 200. The location of object 502 in image 500 has changed from the location of corresponding object 404 in image 400 due to motion of vehicle 110 in the time between acquisition of the first frame of video data corresponding to image 400 and the second frame of video data corresponding to image 500.

The motion of vehicle 110 during the time interval between acquisition of the first frame of video data and the second frame of video data can be determined based on sensors 116 included in vehicle 110 and input to computing device 115. Lateral motion of vehicle can be determined by sensors 116 included in steering components of vehicle 110 that measure the steering wheel direction or angle of the steering wheels, typically the front wheels of vehicle 110. The steering wheel direction or angle can be combined with an odometer sensor that measures longitudinal movement of the vehicle 110 corresponding to rotation of the driving wheels of the vehicle 110, which can be the front wheels, the rear wheels, or both. The steering wheel direction or angle and the odometer data can be input to a bicycle model of the vehicle. A bicycle mode simplifies the calculation of motion based on latitudinal and longitudinal data by assuming a single rear driving wheel and a single front steering wheel. Samples of the steering angle and odometer data taken over the time period between video frames can be input to the bicycle model to determine a relative change in location and orientation of the vehicle. The relative change in location and orientation of the vehicle can be combined with data regarding the orientation and location of the video camera along with data regarding the magnification of a lens included in the video camera to determine a translation 506 that can be applied to bounding box 504 to translate the bounding box 504 to a new location of bounding box 508 illustrated by dotted lines. Translation is a technique for moving a graphic feature such as a bounding box 508 included in an image by incrementing or decrementing the x, y pixel addresses of each pixel of the graphic feature. Translation changes the pixel address or location of the bounding box 508 without rotating the bounding box 508 with respect to the image. The new bounding box 508 location will include the object 502 where the change in position of the object 502 in image 500 is due to latitudinal and longitudinal motion of the vehicle 110.

Latitudinal and longitudinal motion of a vehicle can also be determined by an inertial measurement unit (IMU). An IMU acquires six axis acceleration data. The six axes correspond to motion with respect to three orthogonal directional axes (x, y, and z) and three rotational motions about the three directional axes (roll, pitch, and yaw). The six accelerations can be input to computing device 115 to be integrated once to provide velocities and twice to provide displacements in six axes. The displacement data from the IMU can be projected onto a plane parallel to a roadway surface to determine motion of the vehicle 110 with respect to the roadway during the time interval between frames of video data. Motion data output from the IMU will be equal to the motion data determined by the bicycle model except for possible errors due to wheel slippage or numerical errors caused by differing sample rates, for example. Motion data output from the bicycle model and motion data output by the IMU can be compared to verify the accuracy of both systems.

Figure 6:
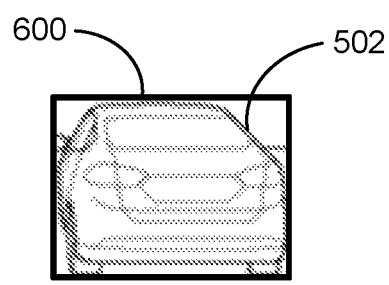
FIG. 6 is a diagram of an example cropped image.

FIG. 6 is a cropped image 600 including an object 502. An image 600 can be cropped by starting with an image 500 from FIG. 5 that includes a bounding box 508 and object 502, for example. All the image data outside of the bounding box 508 is deleted, leaving only image 600 including object 502. The cropped image 600 can be input to a DNN 200 to detect the object 502 included in the cropped image. For example, DNN 200 can fail to detect an object 502 in image 500 from FIG. 5. Following cropping, cropped image 600 can be input to DNN 200 to detect object 502. DNN 200 can detect object 502 in cropped image 600 because extraneous image data from image 500 that can interfere with object detection is no longer included in cropped image 600.

Returning briefly to FIG. 5, translation 506 of bounding box 504 based on motion data of vehicle 110 may not exactly position translated bounding box 508 on object 502. If DNN 200 fails to detect an object 502 in cropped image 600 based on translated bounding box 508, the bounding box 504 can be incrementally moved left or right and up or down, starting at the location of first bounding box 504 and moving in the direction of the latitudinal and longitudinal motion data indicated by vehicle 110 sensors 116. For example, if vehicle sensors 116 indicate that the vehicle 110 is moving to the left, an object 502 in an image 500 will appear to move to the right. If vehicle sensors 116 indicate that the vehicle 110 is moving to the right, an object 502 in an image 500 will appear to move to the left. Likewise, if vehicle sensors 116 indicate that the vehicle 110 is moving forward, an object 502 in an image will appear to move down in image 500. If vehicle sensors 116 indicate that the vehicle 110 is moving backwards, an object 502 will appear to move up in image 500. If DNN 200 fails to detect an object in a cropped image 600, the bounding box 504 can be moved to a plurality of locations and cropped. Each cropped image 600 can be input to the DNN 200 to determine which cropped image 600 includes the object 502 and therefore determine the location of the bounding box 508 that includes the object 502 in the image 500. The location of the bounding box 508 the includes the object 502 can be output along with the image 500 to be included in a training dataset for training the DNN 200.

In some examples, despite a plurality of translations of bounding box 508 and a plurality of cropped images 600 at different locations of image 500, DNN 200 may fail to detect an object 502. DNN 200 can fail to detect object 502 due to changes in appearance of object 502 due to partial obscuring of object 502. For example, another object can temporarily come between vehicle 110 and object 502. Cropped image 600 can be processed using image processing software to enhance the appearance of object 502 to permit DNN 200 to detect the object 502 more easily. For example, cropped image 600 can be subject to super resolution processing. Super resolution processing is a technique for increasing the resolution of an image to a higher spatial resolution by inputting the image to a deep neural network trained to increase image resolution by interpolating image details between the pixels of an input image.

Other techniques for enhancing cropped image 600 include blurring, which is an image processing technique for simulating motion blur due to relative motion between the object 502 and the camera acquiring the data. Motion blur can make the object 502 in cropped image 600 appear more realistic and therefor more likely to be detected by a DNN 200. Motion blur can be applied to a cropped image 600 using an image processing program such as Photoshop, available from Adobe, San Jose, CA 95110. Another technique for enhancing cropped image 600 includes zooming, where the resolution and the apparent size of an object 502 in a cropped image 600 is made larger or smaller. Zooming is typically accomplished by interpolating image pixels without adding details as in super resolution described above. Zooming can also be applied to a cropped image 600 using Photoshop or the like. Another technique for enhancing cropped images 600 is hierarchical pyramid processing where a cropped image 600 is converted to a plurality of images each at different resolutions and processed as a sequence to determine whether one or more resolutions permit detection of object 502. Hierarchical pyramid processing can be performed on a cropped image 600 by using a series of convolution kernels at multiple resolutions. Convolutional kernels for processing cropped images 600 are also available in image processing programs such as Photoshop. One or more of these techniques for image enhancement can be tried at a plurality of positions in image 500 to detect an object 502 in a cropped image 600.

Figure 7:
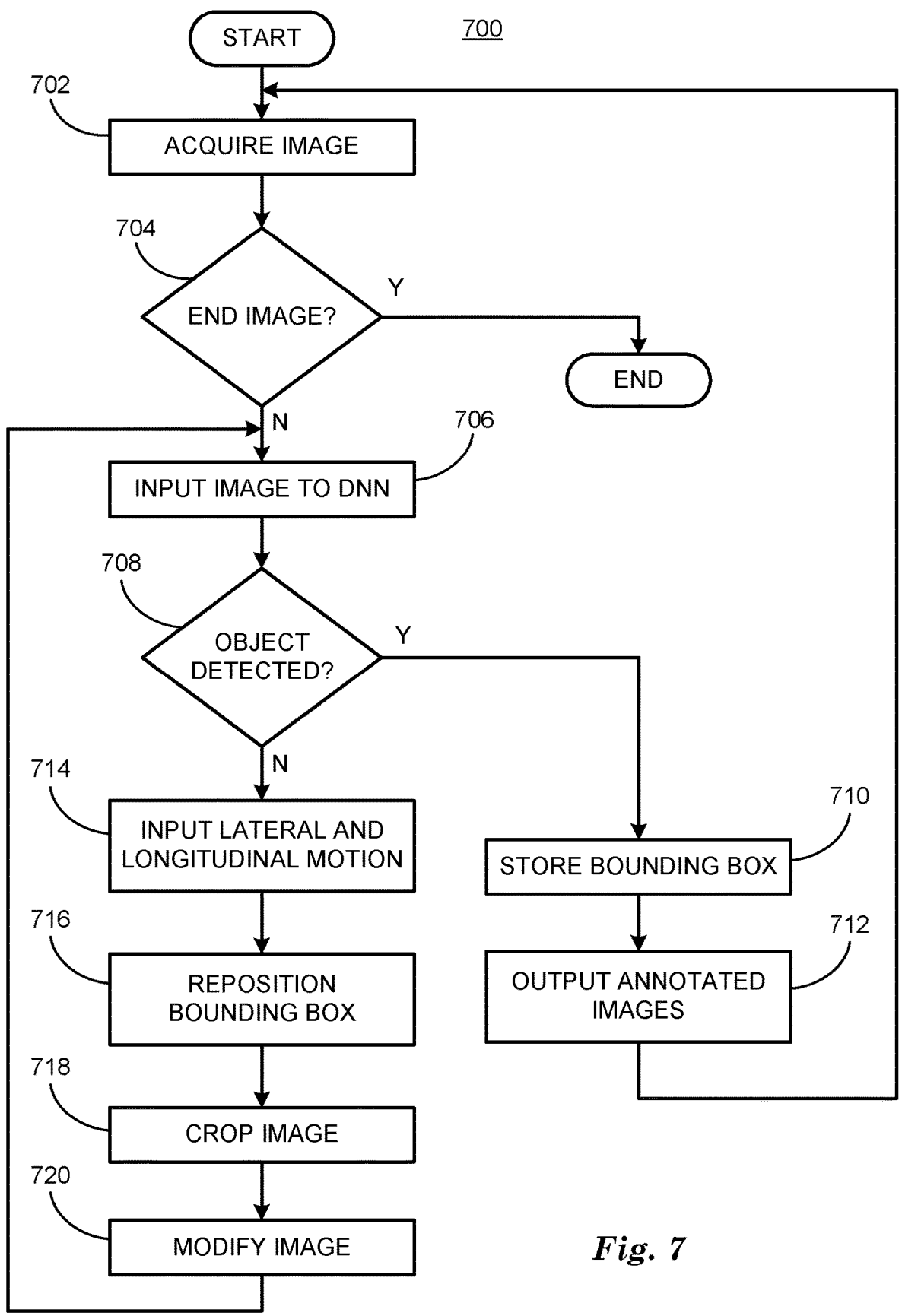
FIG. 7 is a flowchart diagram of an example process to determine annotated images.

FIG. 7 is a diagram described in relation to FIGS. 1-5, of a process 700 for generating annotated images for training a DNN 200. Process 700 can be implemented by a processor of computing device, taking as input information from sensors, and executing commands, and outputting object information, for example. Process 700 includes multiple blocks that can be executed in the illustrated order. Process 700 could alternatively or additionally include fewer blocks or can include the blocks executed in different orders. Process 700 can be implemented on a computing device 115 included in a vehicle 110, for example.

Process 700 begins at block 702, where an image is acquired as a frame of video data from a video sequence output from a video camera. Vehicle 110 can include a video camera arranged to acquire video data of the environment in front of the vehicle 110 as it travels on a roadway, for example.

At block 704 process 700 checks to see if the video sequence has ended. If the video sequence has not ended and an image is available, process 700 passes to block 706. If the video sequence has ended an no more images are available for processing, process 700 ends.

At block 706 the acquired image is input to a DNN 200. The DNN 200 has been trained to detect an object 404, 502 in image data as discussed above in relation to FIGS. 2-6. The DNN 200 can either output an object label and bounding box 402, 504 or fail to detect an object 404, 502 in the image. Input to DNN 200 at block 706 can be an image 400, 500 that includes an object to be detected or a cropped image 600. In examples where DNN 200 detects and object 502 in a cropped image 600, block 706 outputs the original, uncropped image 500, the image coordinates of a bounding box 504 from a previous frame determined at block 714 and translation 506 data that describes how the location of the cropped image 600 was determined relative to the image coordinates of the bounding box 504 from the previous image 500.

At block 708 the process 700 checks to see whether the DNN 200 has detected an object 404, 502 in the input image. If an object 404, 502 was detected and a label and bounding box 402, 504 is available, process 700 passes to block 710. If the object 502 was included in a cropped image 600, the original image 500 from which the cropped image 600 was determined, a bounding box 504 based on a previous image 400 and translation 506 data to indicate where the cropped image 600 was determined in relation to the pixel address of the bounding box 504 are passed onto block 710. If the DNN 200 fails to detect an object, process 700 passes to block 714.

At block 710 process 700 stores the image 400 and bounding box 402 or the image 500 and a bounding box 508 based on a previously detected bounding box 504 and translation 506 data based on DNN 200 detecting an object 502 in a cropped image 600. As discussed above in relation to FIG. 3, a bounding box can be determined by an upper left corner and a lower right corner.

At block 712 process 700 outputs the image 400 and bounding box 402 or the image 500 and a bounding box 508 based on a previously detected bounding box 504 and translation 506 data based on DNN 200 detecting an object 502 in a cropped image 600 to a training dataset included in computing device 115. Following block 712 process 700 passes to block 702 to input an image corresponding to the next frame of video data input from a video sensor included in the vehicle 110.

At block 714, the DNN 200 has failed to detect an object in an image. Process 700 assumes that at least one object 404 has been detected for a previous image 400 acquired at block 702. At block 714 process 700 inputs lateral and longitudinal motion data for the time period between the successful detection of an object 404 that resulted in storing the bounding box 402 at block 710 and the acquisition of the image 500 in which DNN 200 failed to detect an object. The lateral and longitudinal data can be input to a bicycle model or processed as six-axis IMU data as discussed above in relation to FIG. 3 to determine translation 506 data.

At block 716 the translation 506 data is used to translate a bounding box 504 recalled from memory included in computing device 115 to determine a new bounding box 508 in the current image 500 as discussed above in relation to FIG. 5. Note that translation 506 data can indicate an x direction, left or right, and a y direction, up or down, relative to the previous bounding box 504. The pixel coordinates of bounding box 508 can be incremented by a user-determined increment in the directions indicated by the translation 506 data. Moving the bounding box 504 by translating the location of the bounding box 504 by the user-determined increment can have the effect of sliding the bounding box 508 on the image 500 in steps. At each step a cropped image 600 is determined and passed back to the DNN 200 to try to detect an object 502 a block 706. The location of the bounding box 504 can be incremented in the x direction, the y direction or both at each step until DNN 200 detects an object 502 in a cropped image 600. In examples where the DNN 200 fails to detect an object 502 and block 716 has exhausted the possible locations for bounding box 508, the image 500 can be discarded and a new image 500 can be acquired at block 702. In some examples image 500 in which DNN 200 has not detected an object 502 can be stored by computing device 115 and when an object 502 is detected in a subsequent image 500, a location for a bounding box 508 in the stored image 500 can be interpolated between a previous image 400 and a subsequent image 500.

At block 718 the translated bounding box 508 is used to determine a cropped image 600 based on the current image 500 as discussed above in relation to FIG. 6.

At block 720 the cropped image 600 can be modified using super resolution, blurring, zooming, or hierarchical pyramid processing. The cropped image 600 is not subject to modification unless the DNN 220 has failed to detect an object 502 in the cropped image 600 despite translating the cropped image 600 to all available positions in an image 500, i.e., when the location of the cropped image 600 is at the edge or border of the image 500 and cannot be translated any further. In examples where the DNN 200 has failed to detect and object 502 in the cropped image 600 despite translating the cropped image 600 to a plurality of locations in an image 500, the location of the cropped image 600 can be returned to the starting translation and an image modification can be performed on the cropped image 600 and the modified cropped image can be stepped over the x and y translation 506 increments and sent back to be processed by DNN 200 at block 706. The image modifications can be applied to the cropped image 600 in turn, first performing super resolution, and if an object 502 is not detected, the cropped image 600 can be stepped through the translations and blurring can be applied to the cropped image 600 followed by processing with DNN 200. If an object is not detected in the blurred cropped image 600, the cropped image 600 can be stepped through the translations and zooming can be applied to the cropped image 600 followed by processing with the DNN 200. Finally, if an object 502 is not detected in the zoomed cropped image 600, the cropped image can be stepped through the translations and hierarchical pyramid processing applied to the cropped image 600 followed by processing with the DNN 200. If an object 502 is not found in the translated, modified, cropped image 600, the image can be discarded and a new image acquired at block 702.

Techniques described above in relation to FIG. 7 can improve training of a DNN 200 to detect objects by generating a training dataset that includes a large number, in some examples greater than one million, of annotated images 500. The annotated images 500 can be generated by using lateral and longitudinal motion data from sensors included in a vehicle to translate the location of a bounding box 504 to annotate images 500 in which a DNN 200 has failed to detect an object 502. Techniques described herein can use image processing techniques including super resolution, blurring, zooming and hierarchical pyramid processing to generate a plurality of views of an object 502 to increase the probability that a DNN 200 will detect the object in a cropped image 600. The annotated images 500 can be output to a training dataset that can be uploaded to a server computer 120.

Figure 8:
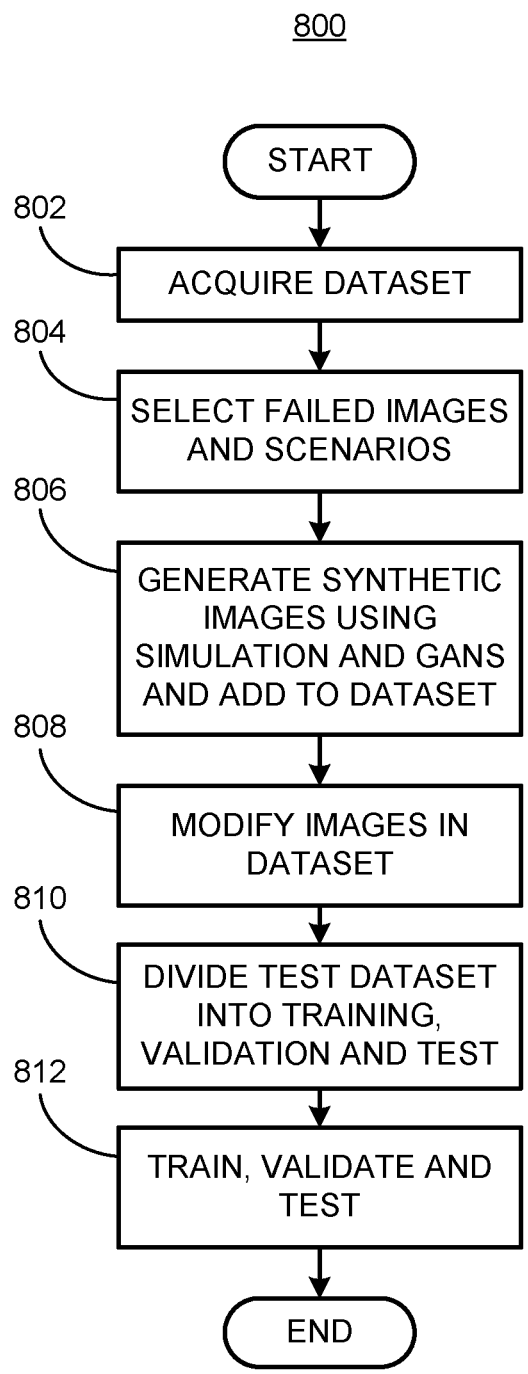
FIG. 8 is a flowchart diagram of an example process to train a deep neural network.

FIG. 8 is a diagram of a flowchart, described in relation to FIGS. 1-7, of a process for training a DNN 200 based on active learning. Active learning is a process for determining when a DNN 200 fails to process an input image and providing a plurality of images based on the failed image to train the DNN 200. Process 800 can be implemented by a processor of computing device, taking as input information from sensors, and executing commands, and outputting object information, for example. Process 800 includes multiple blocks that can be executed in the illustrated order. Process 800 could alternatively or additionally include fewer blocks or can include the blocks executed in different orders.

Process 800 begins at block 802, where a training dataset is acquired. Process 800 can be performed on a server computer 120, for example. The training dataset can be acquired by a computing device 115 in a vehicle 110 executing a process 700 as described in FIG. 7. Following acquiring images annotated with bounding boxes 402, 504, the annotated images can be uploaded to a server computer 120.

At block 804 process 800 selects images from the training dataset in which DNN 200 has initially failed to find objects 404, 502 as discussed above in relation to FIG. 7.

At block 806 process 800 generates synthetic images 302 based on the failed images. Synthetic images 302 including objects 404, 502 can be generated as discussed above in relation to FIG. 3. The synthetic images 302 are passed through a deep neural network configured as a generative adversarial network (GAN) to generate synthetic images 310 that appear more realistic than the synthetic images 302 as discussed above in relation to FIG. 3. The synthetic images 310 can be added to the training dataset to provide additional images for training a DNN 200

At block 808 the failed images from the training dataset are modified to generate additional images for the training dataset. Failed images are images in which an object 502 was not detected by a DNN 200 on the first pass. The failed images are processed using super resolution, blurring, zooming, and hierarchical pyramid cropping as discussed above in relation to FIG. 6. Super resolution is a process for increasing the resolution of an input image. Super resolution can be performed by inputting the failed image into an appropriately trained deep neural network. Failed images can also be blurred to simulate the effects of vehicle motion on input images. Failed images can also be zoomed in and out to generate images that include additional resolutions to be added to the training dataset. Failed images can also be processed to generate hierarchical pyramid cropping, where each failed image is processed to generate a hierarchy of failed images at a plurality of spatial resolutions. Generating super resolution versions of failed images, blurred versions of failed images, zoomed versions of failed images and hierarchical pyramids of failed image provides additional types of annotated images for the training database to improve the training of the DNN 200.

At block 810 the DNN 200 is trained using the images in the training image dataset. Ground truth corresponding to the images in the training dataset are the object labels and bounding boxes determined by DNN 200 in process 700 described in relation to FIG. 7, above. The training dataset can be divided randomly into three portions: a training portion, a validation portion, and a testing portion. The training portion is used to train the DNN 200 as discussed above in relation to FIG. 2. An image is input to the DNN 200 and the resulting output is compared to the ground truth to determine a loss function. The image is processed a plurality of times to determine a minimum value for the loss function which is used to select a set of weights for the layers of the DNN 200. Following training, the validation portion of the training dataset is processed by the DNN 200 to determine whether the training is producing valid results. The weights selected using the training portion of the dataset can be fine-tuned using the validation portion of the dataset to improve the results. The test portion of the training dataset can be used to determine the performance of the DNN 200. For example, the percentage of the test portion images successfully processed by DNN 200 can be the final test score corresponding to the performance of the DNN 200. The performance of the DNN 200 can be required to exceed a user-selected value, for example 90% before the DNN 200 is released for use in a vehicle 110. Following training, validation, and testing, the DNN 200 can be downloaded to a computing device 115 in a vehicle 110 to be used to operate the vehicle 110. Following block 812 process 800 ends.

Training a DNN 200 based on active learning as described in relation to FIG. 8, above can improve training of a DNN 200 by providing a training dataset that includes a large number of annotated images 500 including images 500 that have previously caused the DNN 200 to fail to detect objects 502. Training a DNN 200 is also improved by determining which images 500 have caused the DNN 200 to fail and generating simulated images 302 that include the types of objects 502 that the DNN 200 has failed to detect. The simulated images are and inputting the simulated images to a GAN that generates synthetic images that include the simulated objects while improving the realism of the images. Training a DNN 200 is further improved by applying image processing techniques to the images to modify the appearance of objects included in the images using super resolution, blurring, zooming, and hierarchical pyramid processing to generate a plurality of images for each image in the training dataset that include objects that vary in appearance and size by rendering the objects at a plurality of spatial resolutions.

Figure 9:
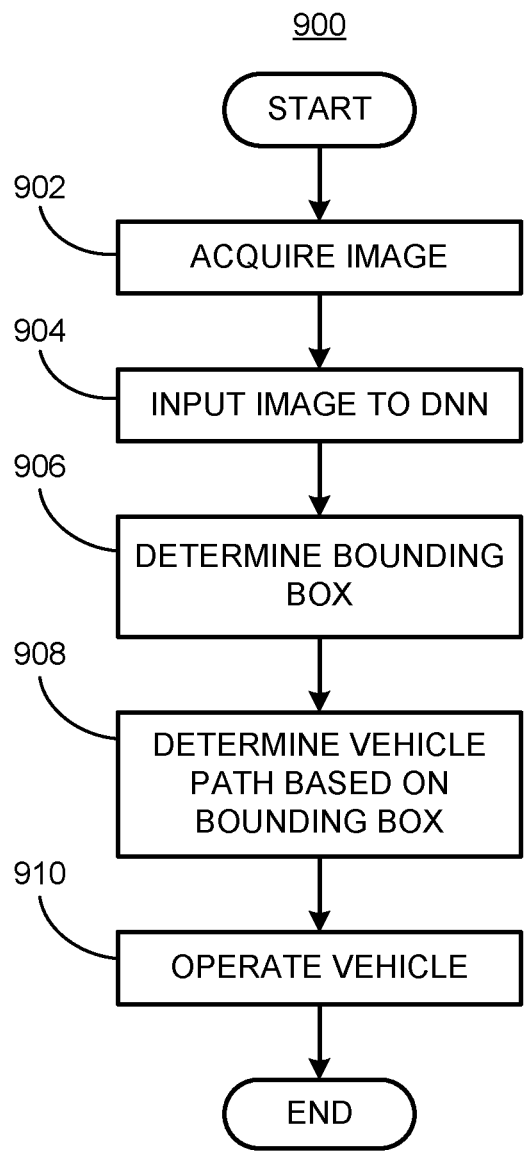
FIG. 9 is a flowchart diagram of an example process to operate a vehicle using a deep neural network.

FIG. 9 is a diagram of a flowchart, described in relation to FIGS. 1-7, of a process for operating a vehicle 110 using a DNN 200 trained using process 700 as discussed above in relation to FIG. 7. Process 900 can be implemented by a processor of computing device, taking as input information from sensors, and executing commands, and outputting object information, for example. Process 900 includes multiple blocks that can be executed in the illustrated order. Process 900 could alternatively or additionally include fewer blocks or can include the blocks executed in different orders.

Process 900 begins at block 902, where an image is acquired by a sensor 116, which can be a video sensor, included in a vehicle 110.

At block 904 the image is input to a DNN 200 executing on a computing device 115 included in a vehicle 110. The DNN 200 has been trained to detect objects using process 700, above.

At block 906 the DNN 200 determines an object label and bounding box for an object included in the input image and outputs the object label and bounding box to computing device 115.

At block 908 computing device 115 determines a vehicle path for vehicle 110 to operate on based on the object label and bounding box determined at block 906. Determining a vehicle path can include determining a polynomial function that avoids contact between the vehicle 110 and the detected object while maintaining minimum and maximum limits on lateral and longitudinal accelerations.

At block 910 computing device 115 operates the vehicle 110 by communicating commands to controllers 112, 113, 114 to control vehicle powertrain, vehicle brakes, and vehicle steering to cause vehicle 110 to travel along the determined vehicle path. Following block 910 process 900 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
 a processor; and
 a memory, the memory including instructions executable by the processor to:
  acquire a first image from a first sensor included in a vehicle and input the first image to a deep neural network to determine a first bounding box for a first object;
  receive a second image from the first sensor;
  receive latitudinal and longitudinal motion data from second sensors included in the vehicle corresponding to a time between inputting the first image and inputting the second image;
  determine a second bounding box by translating the first bounding box based on the latitudinal and longitudinal motion data;
  crop the second image based on the second bounding box;
  input the cropped second image to the deep neural network to detect a second object; and
  output the first image, the first bounding box, the second image, and the second bounding box.

2. The computer of claim 1, the instructions including further instructions to, upon trying and failing to determine the second bounding box using the deep neural network, determine the second bounding box by translating the first bounding box based on the latitudinal and longitudinal motion data.

3. The computer of claim 1, the instructions including further instructions to upload the first image, the first bounding box, the second image, and the second bounding box to a second computer to train the deep neural network.

4. The computer of claim 1, the instructions including further instructions to determine the second bounding box by incrementally translating the first bounding box in directions indicated by the latitudinal and longitudinal motion data.

5. The computer of claim 1, wherein the second sensors include sensors that acquire one or more of steering wheel direction and vehicle forward/backward motion.

6. The computer of claim 1, wherein the second sensors include an inertial measurement unit.

7. The computer of claim 1, the instructions including further instructions to transform the cropped second image to a higher spatial resolution by super resolution.

8. The computer of claim 1, the instructions including further instructions to transform the cropped second image to include motion blurring.

9. The computer of claim 1, the instructions including further instructions to transform the cropped second image to by zooming the cropped second image.

10. The computer of claim 1, the instructions including further instructions to transform the cropped second image to include hierarchical pyramid processing to obtain image data including the second object at a plurality of spatial resolutions.

11. The computer of claim 1, wherein one or more of the first and second bounding boxes are used to operate the vehicle.

12. The computer of claim 11, the instructions including further instructions to determine a vehicle path based on one or more of the first and second bounding boxes.

13. The computer of claim 12, the instructions including further instructions to operate the vehicle on the vehicle path by controlling vehicle powertrain, vehicle brakes and vehicle steering.

14. A method, comprising:
 acquiring a first image from a first sensor included in a vehicle and input the first image to a deep neural network to determine a first bounding box for a first object;

receiving a second image from the first sensor;

receiving latitudinal and longitudinal motion data from second sensors included in the vehicle corresponding to a time between inputting the first image and inputting the second image;

determining a second bounding box by translating the first bounding box based on the latitudinal and longitudinal motion data;

cropping the second image based on the second bounding box;

inputting the cropped second image to the deep neural network to detect a second object; and outputting the first image, the first bounding box, the second image, and the second bounding box.

15. The method of claim 14, further comprising, upon trying and failing to determine the second bounding box using the deep neural network, determining the second bounding box by translating the first bounding box based on the latitudinal and longitudinal motion data.

16. The method of claim 14, further comprising uploading the first image, the first bounding box, the second image, and the second bounding box to a second computer to train the deep neural network.

17. The method of claim 14, further comprising determining the second bounding box by incrementally translating the first bounding box in directions indicated by the latitudinal and longitudinal motion data.

18. The method of claim 14, wherein the second sensors include sensors that acquire one or more of steering wheel direction and vehicle forward/backward motion.

19. The method of claim 14, wherein the second sensors include an inertial measurement unit.

20. The method of claim 14, further comprising transforming the cropped second image to a higher spatial resolution by super resolution.

* * * * *